United States Patent
Philippe et al.

(10) Patent No.: US 11,045,974 B2
(45) Date of Patent: Jun. 29, 2021

(54) METHOD FOR MANUFACTURING A PART MADE FROM A COMPOSITE MATERIAL BY MEANS OF THE INJECTION OF A LADEN CERAMIC SLURRY INTO A FIBROUS STRUCTURE

(71) Applicant: SAFRAN CERAMICS, Le Haillan (FR)

(72) Inventors: Eric Philippe, Moissy-Cramayel (FR); Paul Carminati, Moissy-Cramayel (FR); Medhy Damien Bounia, Moissy-Cramayel (FR); Bertrand Desjoyeaux, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 17/046,958

(22) PCT Filed: Apr. 4, 2019

(86) PCT No.: PCT/FR2019/050796
§ 371 (c)(1),
(2) Date: Oct. 12, 2020

(87) PCT Pub. No.: WO2019/197757
PCT Pub. Date: Oct. 17, 2019

(65) Prior Publication Data
US 2021/0046671 A1   Feb. 18, 2021

(30) Foreign Application Priority Data

Apr. 13, 2018 (FR) ..................................... 1853258

(51) Int. Cl.
*C04B 35/80* (2006.01)
*B28B 1/26* (2006.01)
(Continued)

(52) U.S. Cl.
CPC .............. *B28B 1/265* (2013.01); *B28B 1/261* (2013.01); *B28B 17/0081* (2013.01);
(Continued)

(58) Field of Classification Search
None
See application file for complete search history.

(56) References Cited

U.S. PATENT DOCUMENTS

| 5,489,408 A * | 2/1996 | Nakano | ..................... B28B 3/02 264/624 |
| 10,239,795 B2 * | 3/2019 | Billotte Cabre | .......... B28B 1/52 |

(Continued)

FOREIGN PATENT DOCUMENTS

| CN | 1659012 A | 8/2005 |
| CN | 107207354 A | 9/2017 |

(Continued)

OTHER PUBLICATIONS

International Preliminary Report on Patentability and the Written Opinion of the International Searching Authority as issued in International Patent Application No. PCT/FR2019/050796, dated Oct. 13, 2020.

(Continued)

*Primary Examiner* — Alison L Hindenlang
*Assistant Examiner* — Andrés E. Behrens, Jr.
(74) *Attorney, Agent, or Firm* — Pillsbury Winthrop Shaw Pittman LLP

(57) ABSTRACT

A process for manufacturing a composite part includes arranging a fibrous preform in a mold including an impregnation chamber which includes in its lower part a filter by making a first face of the preform rest on the filter, the impregnation chamber being closed by a flexible membrane placed opposite a second face of the preform, the membrane separating the impregnation chamber from a compaction (Continued)

chamber. The process further includes injecting a compression fluid into the compaction chamber so as to apply a first pressure on the membrane and injecting a slurry including ceramic particles into the impregnation chamber with a second pressure while maintaining the injection of the compression fluid, the second injection pressure of the slurry being lower than the first pressure on the membrane.

11 Claims, 3 Drawing Sheets

(51) Int. Cl.
    *B28B 17/00*     (2006.01)
    *C04B 35/628*     (2006.01)
    *B28B 3/00*     (2006.01)

(52) U.S. Cl.
    CPC ........ *C04B 35/62886* (2013.01); *C04B 35/80* (2013.01); *C04B 2235/5252* (2013.01); *C04B 2235/604* (2013.01); *C04B 2235/616* (2013.01)

(56) References Cited

U.S. PATENT DOCUMENTS

| | | | |
|---|---|---|---|
| 10,323,669 B2* | 6/2019 | Lamouche | F16B 2/245 |
| 2005/0073076 A1 | 4/2005 | Woods et al. | |
| 2006/0233907 A1* | 10/2006 | Ruiz | B29C 70/546 |
| | | | 425/387.1 |
| 2017/0334791 A1 | 11/2017 | Podgorski et al. | |
| 2019/0134848 A1* | 5/2019 | Podgorski | B28B 7/46 |
| 2020/0269468 A1* | 8/2020 | Eberling-Fux | B29C 70/48 |

FOREIGN PATENT DOCUMENTS

| | | |
|---|---|---|
| EP | 0 491 646 A2 | 6/1992 |
| WO | WO 2016/102839 A1 | 6/2016 |
| WO | WO 2016/102842 A1 | 6/2016 |
| WO | WO 2017/187050 A1 | 11/2017 |

OTHER PUBLICATIONS

International Search Report as issued in International Patent Application No. PCT/FR2019/050796, dated Jul. 10, 2019.
Search Report as issued in French Patent Application No. 1853258, dated Feb. 5, 2019.
Norlund, M., et al., "Particle deposition mechanisms during processing of advanced composite materials," ScienceDirect, Composites: Part A, vol. 38, No. 10, Oct. 2007, XP022285451, pp. 2182-2193.
First Office Action as issued in Chinese Patent Application No. 201980025574.5, dated Mar. 30, 2021.

* cited by examiner

METHOD FOR MANUFACTURING A PART MADE FROM A COMPOSITE MATERIAL BY MEANS OF THE INJECTION OF A LADEN CERAMIC SLURRY INTO A FIBROUS STRUCTURE

CROSS-REFERENCE TO RELATED APPLICATIONS

This application is the U.S. National Stage of PCT/FR2019/050796, filed Apr. 4, 2019, which in turn claims priority to French patent application number 1853258 filed Apr. 13, 2018. The content of these applications are incorporated herein by reference in their entireties.

BACKGROUND OF THE INVENTION

The present invention relates to the general field of the manufacture of composite parts, in particular ceramic matrix composite (CMC) parts, i.e. comprising a fibrous reinforcement formed from fibers of ceramic material densified by a matrix also made of ceramic material, such as the oxide/oxide type, for example.

Ceramic matrix composite (CMC) parts are generally manufactured by draping in a mold a plurality of fibrous layers made from ceramic material fibers, for example silicon carbide (SiC), to form a fibrous preform.

The preform is then impregnated with a slurry loaded with particles of ceramic material, such as for example also SiC, by means of an "RTM" injection molding process. In the case of the manufacture of an oxide/oxide type CMC part, the fibers and the slurry particles are made of oxide, such as alumina ($Al_2O_3$).

To do this, the slurry loaded with the ceramic particles is injected into the cavity separating the mold from its counter-mold in which the preform is located, in order to pass through the preform by application of a pressure gradient. The mold in which the injection of the slurry is carried out comprises a filter at the slurry outlet opening into the mold, thus making it possible to retain the ceramic particles in the mold and to impregnate the preform as the ceramic particles are deposited in the mold.

The current solutions for injection molding of ceramic matrix composite parts however encounter a problem for the manufacturing of large and thin parts such as exhaust manifolds. For example, for parts with a diameter of 1.5 m and a thickness of 1 mm, the dimensional tolerances imposed on the mold and counter-mold are extremely fine, making it very complicated to manufacture a mold and counter-mold that are suitable for the manufacturing of such a part.

Also known is the document WO2016/102842 which describes an injection molding tooling (RTM) that uses a deformable membrane instead of a counter-mold. Such a solution avoids dimensional tolerance problems.

For example, in WO2016/102842, the slurry is injected into the impregnation chamber in which the fibrous preform is arranged, and then pressure is exerted on the flexible membrane in order to make the slurry penetrate through the fibrous preform.

However, it is difficult to control the fiber volume rate with the solution described in WO2016/102842.

Moreover, the solution described in WO2016/102842 may also encounter problems of inhomogeneity in the deposition of the slurry powder particles inside the fibrous preform.

SUBJECT MATTER AND SUMMARY OF THE INVENTION

The main purpose of the present invention is therefore to overcome such disadvantages by proposing a solution for manufacturing a composite part with fibrous reinforcement allowing better control of the fiber volume rate.

Another purpose of the present invention is to allow a better sedimentation of the slurry particles within the fibrous reinforcement.

Thus, according to a first aspect, the invention proposes a process for manufacturing a composite part comprising the following steps:

arrangement of a fibrous preform in a mold comprising an impregnation chamber which comprises in its lower part a filter by making a first face of the preform rest on said filter, the impregnation chamber being closed by a flexible membrane located opposite a second face of the preform, said membrane separating the impregnation chamber from a compaction chamber;

characterized in that the process further comprises the following steps:

injection of a compression fluid into the compaction chamber so as to apply a first pressure on the membrane;

injection of a slurry comprising ceramic particles into the impregnation chamber with a second pressure while maintaining the injection of the compression fluid, the second injection pressure of the slurry being lower than the first pressure on the membrane.

The process can include the following features, taken alone or in combination depending on the technical possibilities:

the process comprises the following step: progressive increase of the first pressure on the membrane and of the second injection pressure of the slurry with maintenance of the second injection pressure of the slurry lower than the first pressure on the membrane;

the pressure difference between the first pressure and the second pressure is kept constant at a predetermined value;

the pressure difference between the first pressure and the second pressure is less than 5 bar;

the pressure difference between the first pressure and the second pressure is less than 2 bar;

the pressure difference between the first pressure and the second pressure is between 0.5 and 1 bar;

the process comprises a presaturation step carried out before the injection of the slurry and wherein a liquid is injected through the preform into the impregnation chamber.

According to a second aspect, the invention proposes a system for manufacturing a composite part comprising:

a mold which comprises an impregnation chamber having in its lower part a filter intended to receive a first face of a preform, the impregnation chamber being closed by a flexible membrane located opposite the filter, said membrane separating the impregnation chamber from a compaction chamber;

a device for injecting a compression fluid into the compaction chamber so as to apply a first pressure on the membrane;

a device for injecting a slurry comprising ceramic particles suspended in a liquid phase into the impregnation chamber with a second pressure;

characterized in that the system further comprises a control unit configured to control the compression fluid injection device and the slurry injection device to maintain the second injection pressure of the slurry lower than the first pressure on the membrane.

The system can include the following features, taken alone or in combination according to the technical possibilities:
the mold includes a slurry inlet opening leading to a distribution grid inside the impregnation chamber;
the distribution grid comprises a face opposite the slurry inlet opening which is covered by a porous non-stick layer;
the mold has a slurry outlet opening leading to a drainage grid, said drainage grid being covered by the filter;
the drainage grid has a face opposite the slurry outlet that is covered by a porous non-stick layer.

BRIEF DESCRIPTION OF THE DRAWINGS

Other features and advantages of the present invention will be apparent from the description made below, with reference to the appended drawings which illustrate an example embodiment with no restrictive character. On the figures.

DETAILED DESCRIPTION OF THE INVENTION

Figure 1A:
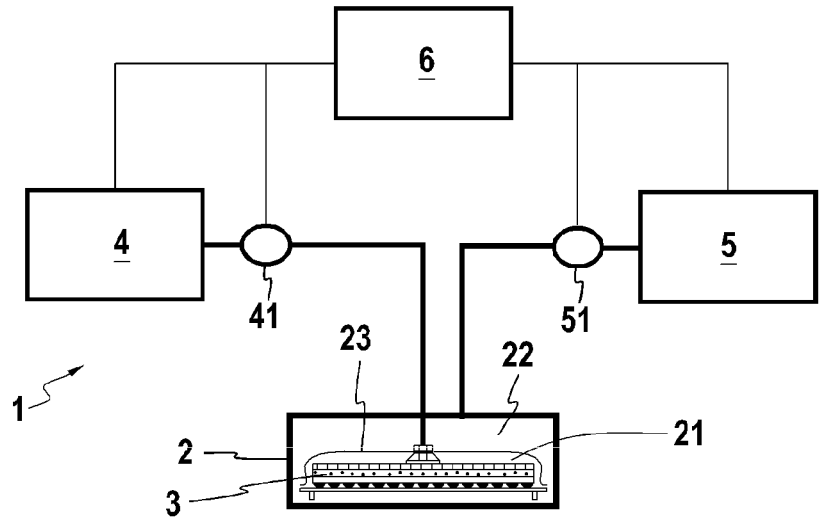
FIG. 1a shows a system for manufacturing a composite part.
Figure 1B:
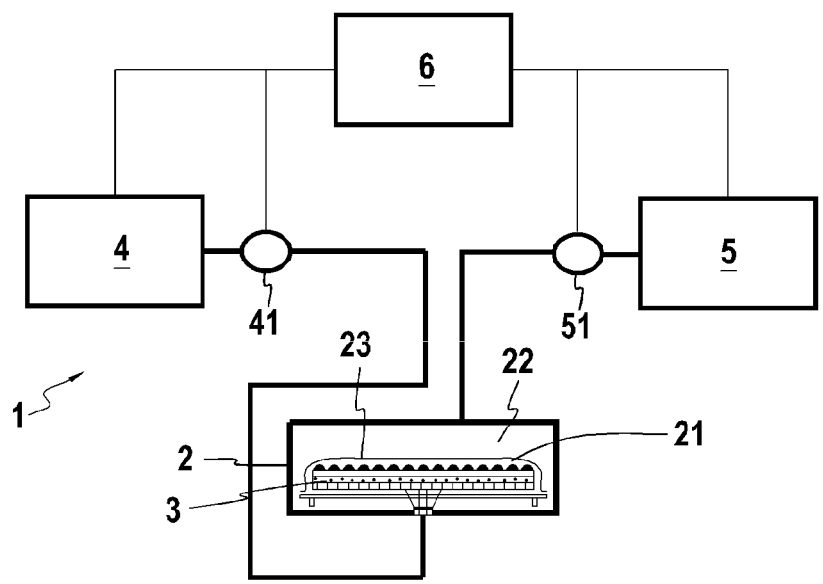
FIG. 1b shows another possible variant of a system for manufacturing a composite part.
Figure 2:
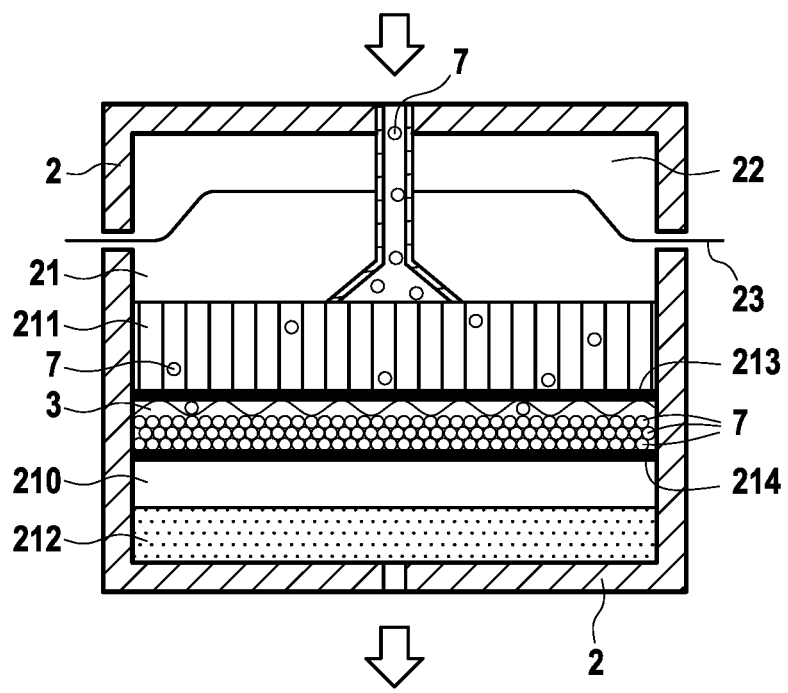
FIG. 2 schematically represents the deposition of the slurry particles inside the fibrous preform.

As shown in FIGS. 1a, 1b and 2, a system 1 for manufacturing a composite part comprises a mold 2 which comprises on the one hand an impregnation chamber 21 in which a fibrous preform 3 is arranged in order to be impregnated by a ceramic matrix, and on the other hand a compaction chamber 22 in which a compression fluid is injected in order to apply pressure to the preform 3 during the impregnation of said preform 3.

The impregnation chamber 21 and the compaction chamber 22 of the mold 2 are separated by a flexible membrane 23. The membrane 23 allows pressure to be applied to the preform 3 installed in the impregnation chamber 21 by injecting compression fluid into compaction chamber 22, the compression fluid applying pressure on the membrane which deforms and in turn applies pressure on the preform 3. The membrane 23 is for example made of silicone.

As shown in FIG. 1a, the slurry that is injected through the preform 3 can be injected through an inlet opening located on the same face of the preform 3 as the membrane 23. According to another variant shown in FIG. 1b, the inlet opening through which the slurry is injected through the preform 3 can be on a face of said preform 3 opposite the face of said preform 3 on which the membrane 23 is located.

In the variant of FIG. 1a, the impregnation chamber 21 comprises in its lower part (upper part for the variant of FIG. 1b) a filter 210 on which rests a first face of the preform 3 when said preform 3 is placed inside the impregnation chamber. The shape of the filter 210 is adapted to hold the first face of the preform 3 in the shape to be manufactured.

The filter 210 can for example be made of microporous polytetrafluoroethylene (PTFE), of resin, of metal, such as for example aluminum or stainless steel.

The preform 3 can be made by stacking layers or plies obtained by two-dimensional (2D) weaving. The preform 3 can also be made directly in one piece by three-dimensional (3D) weaving. As used herein, "two-dimensional weaving" refers to a classical weaving method in which each weft thread passes from one face to the other of yarns of a single warp layer or vice versa. As used herein, "three-dimensional weaving" or "3D weaving" refers to weaving in which warp yarns pass through several layers of weft yarns, or weft yarns pass through several layers of warp yarns.

The preform 3 can also be made by unidirectional (UD) fiber webs, which can be obtained by automatic fiber placement (AFP) or filament winding.

The preform 3 can be made from fibers made of the following materials: alumina, mullite, silica, aluminosilicate, borosilicate, silicon carbide, carbon, or a mixture of several of these materials.

As shown in FIG. 2, The system 1 may include a distribution grid 211 on which the slurry inlet opening opens into the impregnation chamber 21. This distribution grid 211 allows better distribution of the slurry over the entire surface of the preform 3. In addition, a first porous non-stick layer 213, for example made of porous Teflon, can be applied to the face of the distribution grid 211 opposite the slurry inlet opening. This first porous non-stick layer 213 is located between the distribution grid 211 and the preform 3 and facilitates the removal of said preform 3 from the mold 2.

The system 1 may also include a drainage grid 212 located underneath the filter 210. The drainage grid 212 is located in the lower part of the impregnation chamber 21 for the variant in FIG. 1a and in the upper part for the variant in FIG. 1b, so that the slurry outlet opening of said impregnation chamber 21 opens onto said drainage grid 212. In addition, a second porous non-stick layer 214, for example made of porous Teflon, may be applied to the face of the drainage grid 212 opposite the slurry outlet opening. This second porous non-stick layer 214 is located between the drainage grid 211 and the preform 3 and facilitates the removal of said preform 3 from the mold 2.

The system 1 also includes a slurry injection device 4 that is configured to inject the slurry into the impregnation chamber 21 of the mold 2 with a second pressure Pb. The slurry is intended to form the ceramic matrix of the part to be manufactured. The slurry comprises ceramic particles 7 suspended in a liquid phase.

The liquid phase of the slurry can be water (acidic or basic pH), ethanol, or any other liquid in which the desired powder can be suspended. An organic binder can also be added (PVA, PEG, PVP, water soluble). This binder ensures that the raw material remains stable after drying and before sintering.

The ceramic particles 7 of the slurry can be alumina, mullite, silica, zirconia, aluminosilicate or aluminophosphate, or a mixture of these components. The ceramic particles 7 can also be made of carbide, for example silicon carbide. The average size, or mean particle size, of the particles 7 is between 0.1 μm and 10 μm. "Mean size" refers to the size given by the statistical particle size distribution to half of the population, known as D50. The size of the porosities of the filter 210 is adapted to the size of the slurry particles 7 so that said slurry particles 7 do not pass through said filter 210 and are retained in the impregnation chamber 21.

The system 1 also includes a compression fluid injection device 5 that is configured to inject said compression fluid into the compaction chamber 22 of the mold with a first pressure Pm. The compression fluid can for example be compressed air or even water.

The system 1 further includes a control unit 6 which is configured to control the slurry injection device 4 and the compression fluid injection device 5. The control unit 6 includes, for example, a processor associated with a memory on which are stored the instructions for implementing the process for manufacturing the composite part.

The system 1 further comprises on the one hand a first pressure sensor 41 which is configured to measure the injection pressure of the slurry by the slurry injection device 4 and which is connected to the control unit 6, and on the other hand a second pressure sensor 51 which is configured to measure the injection pressure of the compression fluid by the compression fluid injection device 5 and which is connected to the control unit 6.

The process for manufacturing the composite part consists of the following steps:
- place the preform 3 inside the impregnation chamber 21.
- inject the compression fluid into compaction chamber 22 with a first pressure Pm. The first pressure Pm therefore corresponds to the pressure applied to the membrane 23. This step compresses the fibrous preform and gives it the desired fiber volume ratio. This step is performed by the compression fluid injection device 5 controlled by the control unit 6.
- inject the slurry into the impregnation chamber 21 at a second pressure Pb, while continuing to inject the compression fluid into the compaction chamber 22, the second pressure Pb being lower than the first pressure Pm. The injection of the slurry allows the deposition by sedimentation of the particles 7 within the fibrous preform 3. The fact that the second pressure Pb (the injection pressure of the slurry) is lower than the first pressure Pm (the pressure exerted on the membrane 23) ensures a minimum fiber volume rate for the part to be manufactured. This step is carried out by the slurry injection device 4 controlled by the control unit 6.

Thus, the control unit 6 is configured to control the injection devices 4 and 5, in particular using pressure sensors 41 and 51, to keep the second pressure Pb lower than the first pressure Pm.

Preferably, the second pressure Pb is gradually increased during the process, in order to compensate for the pressure losses caused by the deposition of the particles 7 within the fibrous preform, and thus accelerate the sedimentation of said particles 7. In order to maintain the first pressure Pm higher than the second pressure Pb, the first pressure Pm is also increased during the process.

Figure 3A:
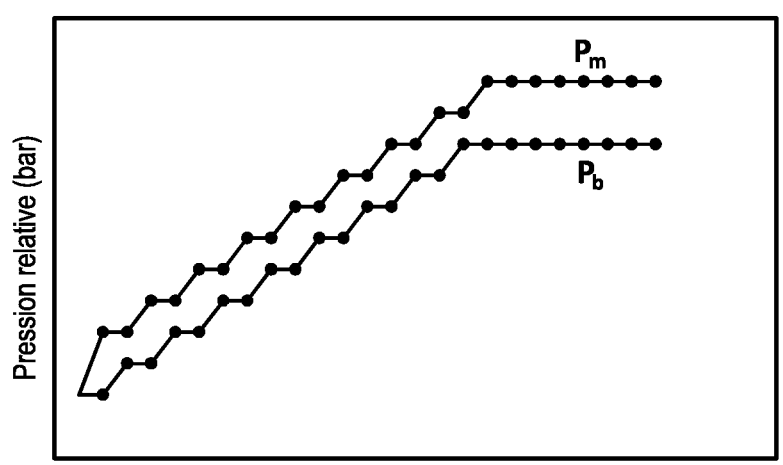
FIGS. 3a and 3b show curves of change in the first pressure and the second pressure according to possible variants.
Figure 3B:
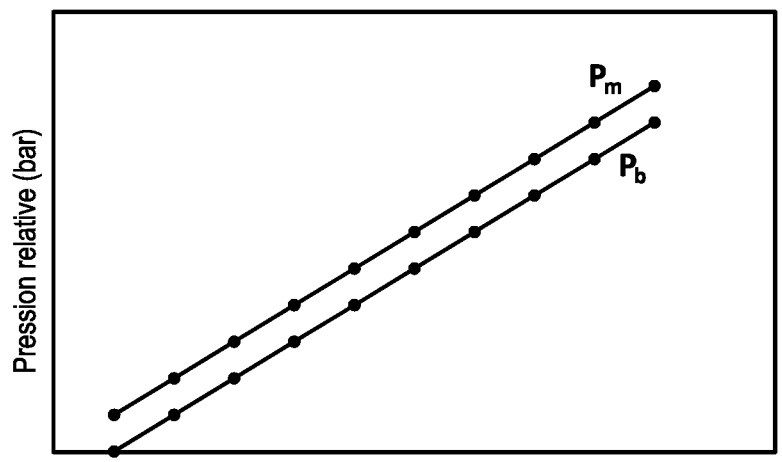

According to an advantageous variant, the process is carried out by first injecting the compression fluid into the compaction chamber 22 so as to apply the first pressure Pm to the preform 3, the value of which gives the desired fiber volume ratio, for example 1 bar. Then the slurry is injected into the impregnation chamber 21 at the second pressure Pb. The first pressure Pm is then increased so that the pressure difference $\Delta P$ between the first pressure Pm and the second pressure Pb ($\Delta P=Pm-Pb$) is equal to the initial value of the first pressure (1 bar in this example), thus making it possible to maintain the fiber volume rate equal to the desired value. The second pressure Pb is gradually increased during the process in order to compensate for pressure losses, the first pressure Pm is also increased in order to keep the pressure difference $\Delta P$ constant. For example, the first pressure Pm can reach a maximum value of 7 bar during the manufacturing process, the maximum value of the second pressure Pb being 6 bar in this example. FIGS. 3a and 3b show examples of changes in the first pressure Pm and the second pressure Pb in order to keep the pressure difference $\Delta P$ constant. According to a variant illustrated in FIG. 3a, the first pressure Pm and the second pressure Pb change in steps. The first pressure Pm increases while the second pressure Pb remains constant, then the second pressure Pb increases while the first pressure Pm remains constant, and so on. According to another variant illustrated in FIG. 3b, the first pressure Pm and the second pressure Pb both change in a linear fashion.

The pressure difference $\Delta P$ is preferably less than 5 bar, in order to limit the compaction of the preform 3, as too much compaction of the preform 3 slows the circulation of the slurry through said preform 3, and thus slows the deposition process by sedimentation of the particles 7. Even more preferentially, the pressure difference $\Delta P$ is less than 2 bar, and even more preferentially is comprised between 0.5 and 1 bar.

A step of pre-saturation in carrier fluid of the preform 3 can be carried out before the injection of the compression fluid and the injection of the slurry in order to eliminate all the air contained in the preform 3 and to adapt the wettability of the fibers. The pre-saturation step is carried out by injecting into the impregnation chamber 21, inside which the preform 3 is placed, a liquid, such as for example water or alcohol. The liquid is not loaded with particles.

The system 1 for manufacturing the composite part may also include heating means, such as resistive elements integrated into the walls of the mold 2, in order to increase the temperature inside the mold 2, and particularly in the impregnation chamber 21, and facilitate the evacuation of the liquid phase of the slurry by evaporation after total injection. The temperature in the mold 2 can be set for example at a temperature comprised between 80° C. and 110° C.

The preform 3, once loaded with particles 7 and dried, is extracted from the mold 2, said preform 3 retaining its compaction geometry after demolding. The preform 3 is then subjected to a sintering heat treatment, for example in air and at a temperature comprised between 1000° C. and 1300° C., in order to sinter the ceramic particles 7 in the preform 3. A ceramic-matrix composite part with a ceramic fiber reinforcement is thus obtained.

Figure 4:
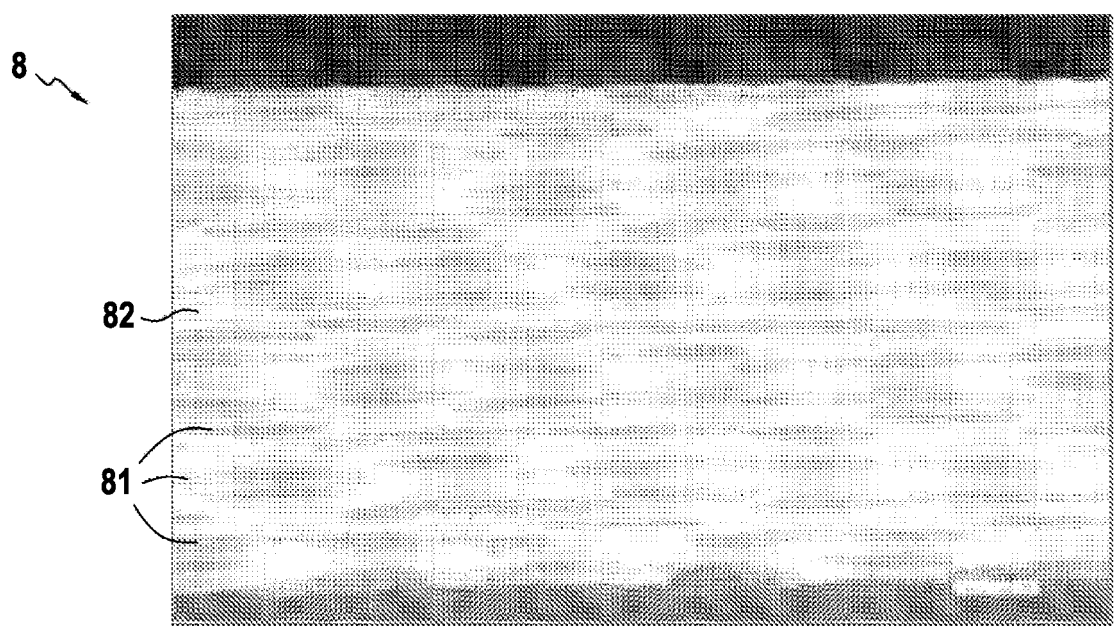
FIG. 4 shows a sectional view of a part obtained with the process according to the invention.

As can be seen in FIG. 4 which illustrates a section of a part 8 made by the process according to the invention with a pressure difference $\Delta P$ (Pm–Pb) of 1 bar. The fibrous reinforcement 81 of the part 8, which corresponds to the preform 3, is formed by stacking a plurality of plies of alumina fibers, and the matrix 82 of said part 8 is also made of alumina. At the time of making the part 8, the target fiber volume content was between 30% and 60%, and preferably between 45% and 55%, a target density greater than 2.5, preferably greater than 3, and a target porosity comprised between 15% and 40%, and preferably between 17% and 23%. The resulting part 8 has a fiber volume content of 48%, a porosity of 20%, and a density of 3.1. In addition, as shown in FIG. 4, the matrix 82 is homogeneous, showing the good sedimentation deposition of the particles 7 within the preform 3.

The invention is particularly applicable to parts having a small thickness and a large surface area, such as turbine engine casings, for example fan casings, compressor casings, and exhaust casings.

The expression "comprised between . . . and . . ." should be understood as including the bounds.

The invention claimed is:

1. A process for manufacturing a composite part comprising:
arranging a fibrous preform in a mold comprising an impregnation chamber-which comprises in its lower part a filter by making a first face of the preform rest on said filter, the impregnation chamber being closed by a flexible membrane placed opposite a second face of the preform, said membrane separating the impregnation chamber from a compaction chamber; characterized in that the process further comprises the following steps:
injecting a compression fluid into the compaction chamber so as to apply a first pressure on the membrane;
injecting a slurry comprising ceramic particles into the impregnation chamber with a second pressure while maintaining the injection of the compression fluid, the second injection pressure of the slurry being lower than the first pressure on the membrane, and
progressively increasing the first pressure on the membrane and the second injection pressure of the slurry with maintenance of the second injection pressure of the slurry lower than the first pressure on the membrane.

2. The process as claimed in claim 1, wherein a pressure difference between the first pressure and the second pressure is kept constant at a predetermined value.

3. The process as claimed in claim 1 wherein a pressure difference between the first pressure and the second pressure is less than 5 bar.

4. The process as claimed in claim 3, wherein the pressure difference between the first pressure and the second pressure is less than 2 bar.

5. The process as claimed in claim 4, wherein the pressure difference between the first pressure and the second pressure is between 0.5 and 1 bar.

6. The process as claimed in claim 1, wherein the process further comprises a pre-saturation step carried out prior to injection of the slurry and wherein a liquid is injected through the preform into the impregnation chamber.

7. A system for manufacturing a composite part comprising:
a mold which comprises an impregnation chamber having in its lower part a filter configured to receive a first face of a preform, the impregnation chamber being closed by a flexible membrane located opposite the filter, said membrane separating the impregnation chamber from a compaction chamber;
a compression fluid injection device for injecting a compression fluid into the compaction chamber so as to apply a first pressure on the membrane;
a slurry injection device for injecting a slurry comprising ceramic particles suspended in a liquid phase into the impregnation chamber with a second pressure, and
a control unit configured to control the compression fluid injection device and the slurry injection device to maintain the second slurry injection pressure lower than the first pressure on the membrane, the control unit being further configured to progressively increase the first pressure on the membrane and the second injection pressure of the slurry while maintaining the second injection pressure of the slurry lower than the first pressure on the membrane.

8. The system as claimed in claim 7, wherein the mold comprises a slurry inlet opening leading to a distribution grid inside the impregnation chamber.

9. The system as claimed in claim 8, wherein the distribution grid comprises a face opposite to the slurry inlet opening which is covered by a first porous non-stick layer.

10. The system as claimed in claim 7, wherein the mold comprises a slurry outlet opening leading to a drainage grid, said drainage grid being covered by the filter.

11. The system as claimed in claim 10, wherein the drainage grid comprises a face opposite the slurry outlet which is covered by a second porous non-stick layer.

* * * * *